(12) United States Patent
Huo et al.

(10) Patent No.: US 10,711,609 B2
(45) Date of Patent: Jul. 14, 2020

(54) VIBRATION AND STRAIN MONITORING METHOD FOR KEY POSITIONS OF TUNNEL BORING MACHINE

(71) Applicant: DALIAN UNIVERSITY OF TECHNOLOGY, Dalian, Liaoning Province (CN)

(72) Inventors: Junzhou Huo, Dalian (CN); Wei Sun, Dalian (CN); Zhichao Meng, Dalian (CN); Xiaoqi Huang, Dalian (CN); Youneng Bao, Dalian (CN)

(73) Assignee: DALIAN UNIVERSITY OF TECHNOLOGY, Dalian, Liaoning (CN)

( * ) Notice: Subject to any disclaimer, the term of this patent is extended or adjusted under 35 U.S.C. 154(b) by 0 days.

(21) Appl. No.: 16/338,956

(22) PCT Filed: Aug. 1, 2017

(86) PCT No.: PCT/CN2017/095532
§ 371 (c)(1),
(2) Date: Apr. 2, 2019

(87) PCT Pub. No.: WO2019/023952
PCT Pub. Date: Feb. 7, 2019

(65) Prior Publication Data
US 2020/0011176 A1 Jan. 9, 2020

(51) Int. Cl.
*E21D 9/10* (2006.01)
*E21D 9/00* (2006.01)
(Continued)

(52) U.S. Cl.
CPC ............... *E21D 9/003* (2013.01); *E21D 9/11* (2013.01); *G01L 5/0061* (2013.01)

(58) Field of Classification Search
CPC .................................................. E21D 9/003
See application file for complete search history.

(56) References Cited

U.S. PATENT DOCUMENTS

| | | | | |
|---|---|---|---|---|
| 5,240,350 A | * | 8/1993 | Yamaguchi | ....... E21B 47/02224 405/143 |
| 8,172,334 B2 | * | 5/2012 | Lindbergh | .............. E21D 9/003 299/1.8 |
| 9,957,796 B2 | * | 5/2018 | Okada | ................... E21D 9/1013 |

FOREIGN PATENT DOCUMENTS

| | | |
|---|---|---|
| CN | 203114288 U | 8/2013 |
| CN | 103867205 A | 6/2014 |

(Continued)

OTHER PUBLICATIONS

Yang, Jing, "Vibration Characteristics Analysis of TBM Cutter-Head System and Research on Tunneling Testing", vol. 7, Jul. 15, 2015, pp. 71-78, China Master's Theses Full-Text Database, Science-Engineering (B).

(Continued)

*Primary Examiner* — Janine M Kreck
(74) *Attorney, Agent, or Firm* — Muncy, Geissler, Olds & Lowe, P.C.

(57) ABSTRACT

The present invention provides a vibration and strain monitoring method for key positions of a tunnel boring machine (TBM), and belongs to the technical field of real-time monitoring for underground construction of the TBM. The present invention aims to provide a monitoring device and an all-weather monitoring and forecasting system thereof. The present invention acquires monitoring data through vibration and strain sensors and a wireless data transmission system, thereby realizing long-term real-time monitoring for vibration and strain states of key positions of a main machine system of the TBM during operation, reminding operators in time for maintenance and repair, preventing (Continued)

fatigue breakage on key weak positions of the main machine system of the TBM and ensuring safe and reliable operation of the TBM. The present invention further provides an evaluation method for strain states of positions which cannot be measured, i.e., an equivalent mapping method, thereby building a set of vibration monitoring and strain monitoring systems for the tunneling process of the key positions of the main machine system of the TBM.

2 Claims, 9 Drawing Sheets

(51) Int. Cl.
  *E21D 9/11* (2006.01)
  *G01L 5/00* (2006.01)

(56) References Cited

FOREIGN PATENT DOCUMENTS

| | | |
|---|---|---|
| CN | 107420105 A | 12/2017 |
| EP | 1 098 066 A1 | 5/2001 |

OTHER PUBLICATIONS

Chen, Hongwei, "Research on Tunnel Boring Machine Construction and Status Monitoring Technology in Jinping with Complex Geology", vol. 4, Apr. 15, 2016, pp. 62-65 and 71-86, China Master's Theses Full-Text Database, Science-Engineering (B).

* cited by examiner

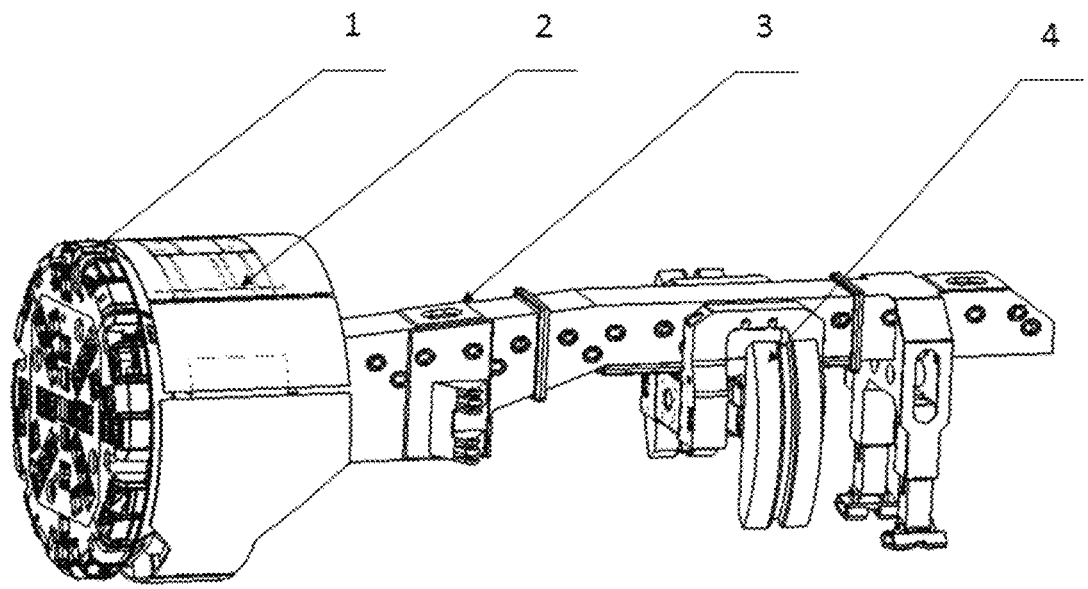
Fig. 1 (Fig.1 as an illustration in Abstract)
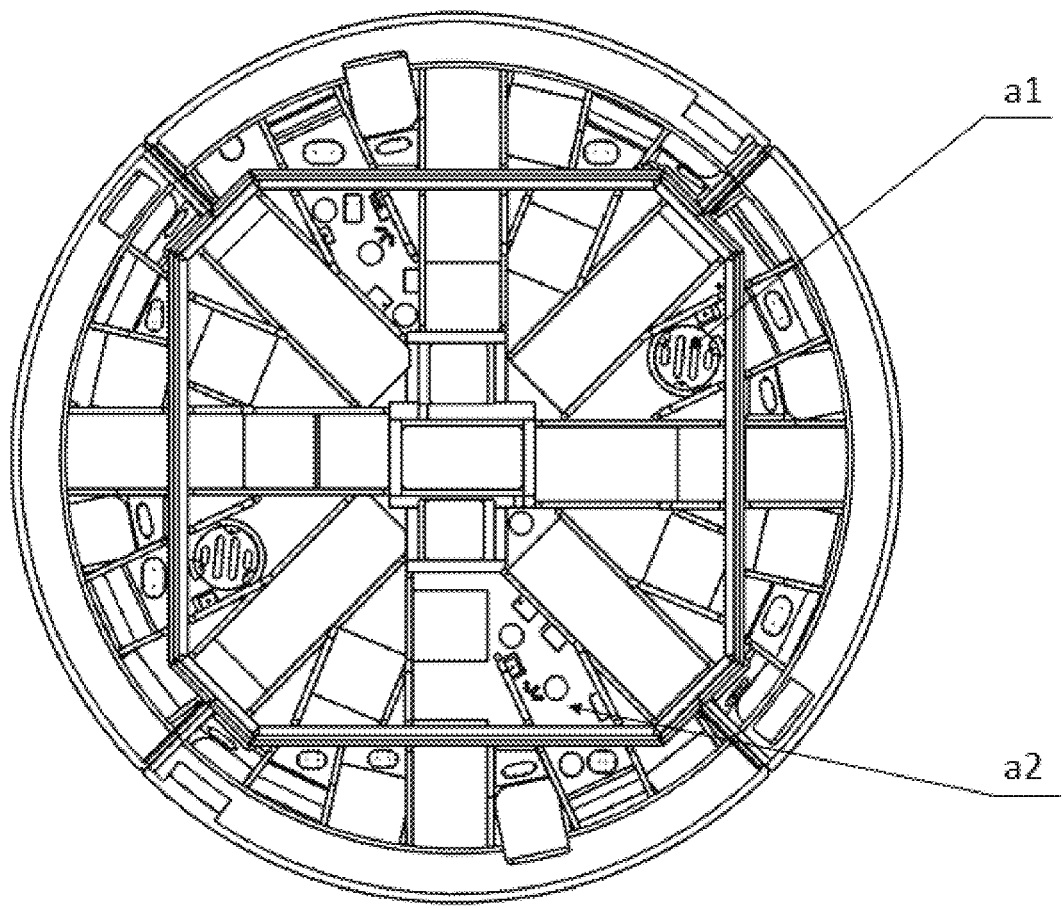
Fig. 2

VIBRATION AND STRAIN MONITORING METHOD FOR KEY POSITIONS OF TUNNEL BORING MACHINE

TECHNICAL FIELD

The present invention relates to vibration and strain real-time monitoring and strain equivalent mapping measurement of a main machine system of a tunnel boring machine (TBM), and belongs to the technical field of real-time monitoring for underground construction of the TBM.

BACKGROUND

With the development of Chinese economy, a tunnel boring machine (TBM) has been widely used in tunnel construction of water conservancy projects, railway transportation, subway projects, oil and gas pipelines, national defense and the like in recent years. During operation of the TBM, due to complicated working conditions, poor service environment and the like, the TBM has the characteristics of heavy load and impact, and finally, key weak positions of a main machine system of the TBM are worn and even broken.

The main machine system of the TBM mainly comprises a cutterhead, a front shield, drive electric motors, a main beam, gripper shoes, etc. A poor load condition is an important factor which causes fault of the main machine system of the TBM. To conduct anti-vibration design of the main machine and life estimation of key structural elements, the vibration condition of the main machine of the TBM and the strain condition of positions of the key structural elements must be mastered. A real-time monitoring system is built for monitoring vibration and strain conditions of key weak positions of the main machine system of the TBM, thereby reminding project builders to repair in time, avoiding further damage and also providing a basis for the improvement of vibration reducing solutions and the life estimation of the key structural elements.

Because the working conditions of the TBM are very bad, it is very difficult to monitor the state of the TBM. At present, there is no complete solution for monitoring vibration and strain of the main machine system of the TBM in China and abroad. Furthermore, in some theoretical dangerous points of key positions, due to the limitation of actual working conditions, sensors cannot be installed for direct measurement. Although some scholars or enterprises collect a small segment of vibration data in the tunneling process, the vibration data has a certain limitation because a small number of samples are collected.

Based on the above condition, the present invention carries out overall safety layout and local strengthening protection measures for the existing vibration and strain sensors, and provides an evaluation method for strain states of positions which cannot be measured, i.e., an equivalent mapping method, thereby building a set of vibration monitoring and strain monitoring systems for the tunneling process of the key positions of the main machine system of the TBM.

Technical Problem

The present invention aims to provide a monitoring device and an all-weather remote monitoring and forecasting system thereof.

Technical Solution

The technical solution of the present invention is as follows:

A vibration and strain monitoring method for key positions of a tunnel boring machine (TBM) comprises the following steps:

A vibration and strain monitoring system and an equivalent mapping method for key positions of the TBM include acceleration nodes used to measure vibration, a strain gauge and strain nodes used to measure strain, an antenna used to amplify a collected signal, a wireless gateway used to accept a wireless signal, a computer used to display measured data, and an equivalent mapping measuring model, wherein a wireless sensor arranged in a key position of a main machine system of the TBM is used to monitor vibration and strain states during operation, and also accept transmitted vibration and strain data based on a wireless network protocol, so as to realize real-time monitoring for the operation state of a key weak position of the main machine system of the TBM. A measurement signal is inputted into the equivalent mapping measuring model for evaluating the strain state of a position which cannot be measured. Specific system building includes the following two aspects: arrangement of a sensor, and an equivalent mapping measuring model.

I. Arrangement of a Sensor

Step 1, Overall Safety Layout

The monitoring method is mainly used to measure a cutterhead 1, a front shield 2, a drive electric motor, a main beam 3 and a gripper shoe 4 of the TBM. An overall structure is shown in FIG. 1. In order to enable the sensor to work safely and steadily, a measurement point, which reflects a motion state and is relatively safe, is selected on each detected component at first. By referring to a large number of practical engineering, the measurement points are selected from places on which scoriae are difficult to drop, and a specific layout is as follows:

A vibration measurement point and a strain measurement point of the cutterhead 1 are selected; sensors are arranged in two manholes (as shown by a1 in FIG. 2) and two water pipe passages (as shown by a2 in FIG. 2); only vibration sensors are arranged in the manholes, and a vibration and a strain sensor are arranged in the water pipe passages; and specific positions of the vibration sensors and the strain sensor are shown in partial enlarged drawings (FIG. 3 and FIG. 4) of the positions of a1 and a2;

A vibration measurement point of the front shield 2 (as shown by b1 in FIG. 5) is selected. A vibration sensors are arranged on the top and the inner surface of the front shield 2, and specific positions are shown in FIG. 5;

A vibration measurement point of the drive electric motor (as shown by c1 in FIG. 6) is selected. A vibration sensor is arranged on the side surface of a motor box, and the specific position is shown in FIG. 6;

A vibration measurement point of the main beam 3 (as shown by c2 in FIG. 6) is selected. A vibration sensor is arranged on the upper surface of the front end of the main beam, and the specific position is shown in FIG. 6;

A vibration measurement point of the gripper shoe 4 (as shown by d1 in FIG. 7) is selected. A vibration sensor is arranged on the inner side surface of the gripper shoe 4, and the specific position is shown in FIG. 7.

Step 2, Local Strengthening Protection Measures and Connection

Because the sensors belong to quick-wear parts, to avoid failure of the sensors due to scoria impact and damp underground environment, the system adds metal protection covers (as shown by e1 in FIG. 8) for sensor nodes (as shown by f2 in FIG. 9) and industrial batteries (as shown by e2 in FIG. 8) so as to realize the actions of impact resistance and water and moisture resistance. The structures of the protection covers of the industrial batteries and the sensor nodes are respectively shown by e1 in FIG. 8 and f1 in FIG. 9. Firstly, detected positions and all the metal protection covers are fixed in a welding mode. Secondly, the sensor nodes (as shown by f2 in FIG. 9) and the protection covers are connected through a powerful magnetic connector (as shown by e3 in FIG. 8), and a groove (as shown by e4 in FIG. 8) corresponding to the magnetic connector is processed in the bottom of the protection cover, so as to ensure that node directions are not shifted in the detection process. Wireless signal transmitting and receiving antennas (as shown by V in FIG. 4) are fixed in a magnetic adsorption mode. The strain gauge (as shown by III in FIG. 4) for collecting strain information is connected and fixed with the detected positions through threads.

Step 3, Power Supply.

Power supply for all the sensors in the system includes two modes. The first mode is used for power supply for the sensors in the cutterhead. Because the cutterhead is a rotating component and a power line is difficult to dispose, the mode of the industrial battery is adopted for power supply. As shown in the FIG. 8, the industrial battery needs to be replaced regularly. Power supply for other sensors adopts a mode of direct power supply by the power line.

Step 4, Signal Transmission and Monitoring.

A wireless gateway is arranged in an operator's console of the TBM, and accepts vibration and strain signals of the cutterhead of the main machine system of the TBM and vibration signals of the front shield, the front section of the main beam, the drive electric motor and the gripper shoe. The wireless gateway gives an early warning in time for the detected strain and vibration signals which are higher than normal values, and displays the detected strain and vibration signals on the computer of the operator's console of the TBM to generate a work log of the TBM.

II. Equivalent Mapping Measuring Model

For the measurement of physical quantities such as workpiece strain and the like, due to the limitations of working conditions of a measurement site and the structure of a workpiece, concerned positions cannot be subjected to related measurement. A method for solving the strain of key positions which cannot be directly measured through the measurement of the strain of other positions is proposed below. A schematic diagram of a measuring model is shown in FIG. 10. An evaluated value of an equivalent mapping to-be-measured point S0 is as follows:

$$\varepsilon_0 = \frac{\beta}{\sum \alpha_i} \left( \sum_{i=1}^{4} (\alpha_i \varepsilon_i)^P \right)^{\frac{1}{P}}.$$

In the formula: $\varepsilon_0$ is the strain of a to-be-measured point S0;

$\varepsilon_i$ is the strain of measurement points S1, S2, S3 and S4;

$\alpha_i$ is a position parameter of each measurement point; $\alpha_i$=1~10; the shorter the distance from each measurement point to the point S0, the larger the corresponding $\alpha_i$ is;

P is a local structural parameter of a measured position formed by the measurement points S1, S2, S3 and S4; if no reinforcing rib is arranged, P=1; and if reinforcing ribs are arranged, P=1-10; the more the reinforcing ribs are, the larger the P is;

$\beta$ is a sudden change coefficient; when reinforcing ribs are arranged at the to-be-measured point S0, $\beta$=0.3~0.7; when sudden change of the strain occurs at the to-be-measured point S0, $\beta$=1.1~1.6; and when no special structure is arranged at the to-be-measured point S0, $\beta$=1.

Error description: because the strain and the load are closely related to the structure of the workpiece, the application range of the method shall not be expanded. After some engineering applications, the diameter of a measuring circle A is generally not greater than 0.5 m. Due to the complexity of the working conditions, the assessment model does not give an accurate calculated value and has a certain error. The error is acceptable in engineering.

Beneficial Effect

The present invention has the beneficial effects that: The present invention acquires monitoring data through the vibration and strain sensors and a wireless data transmission system, thereby realizing long-term real-time monitoring for vibration and strain states of key positions of the main machine system of the TBM during operation, reminding operators in time for maintenance and repair, preventing fatigue breakage on key weak positions of the main machine system of the TBM and ensuring safe and reliable operation of the TBM. In addition, the present invention proposes a novel model for indirectly measuring the strain, i.e., the equivalent mapping measuring model. The strain sensors are arranged around the to-be-measured point to calculate the strain of the to-be-measured point, thereby providing a method for strain measurement of positions in which the sensors cannot be directly arranged.

DESCRIPTION OF DRAWINGS

FIG. 1 is an overall diagram of TBM;

FIG. 2 is a structural diagram of a back surface of a cutterhead;

Figure 3:
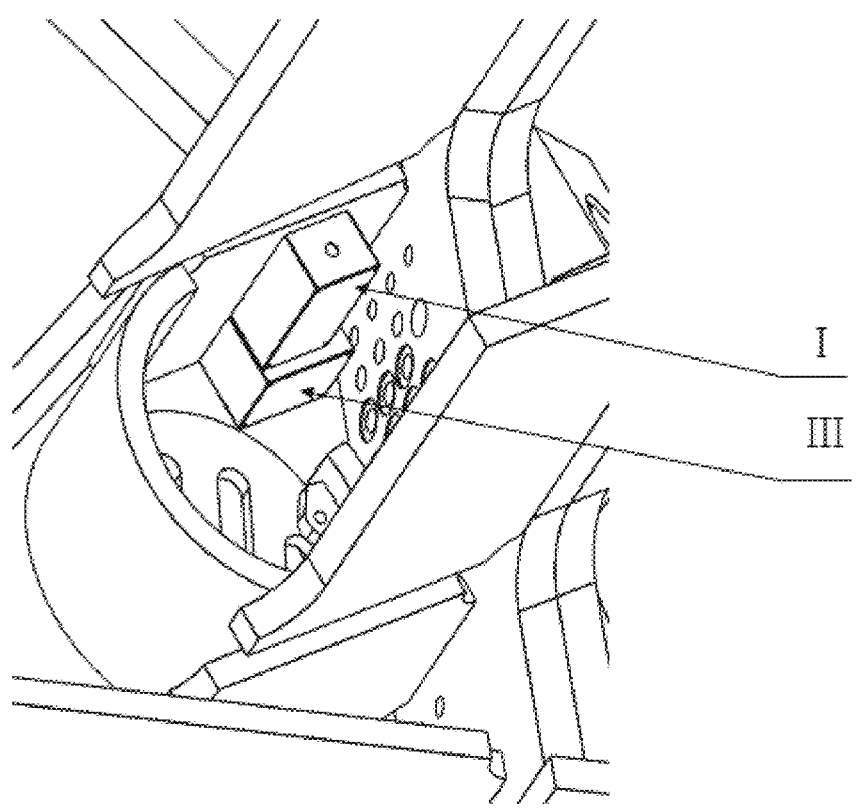
FIG. 3 is a partial enlarged drawing of a position of a manhole of a cutterhead.
Figure 4:
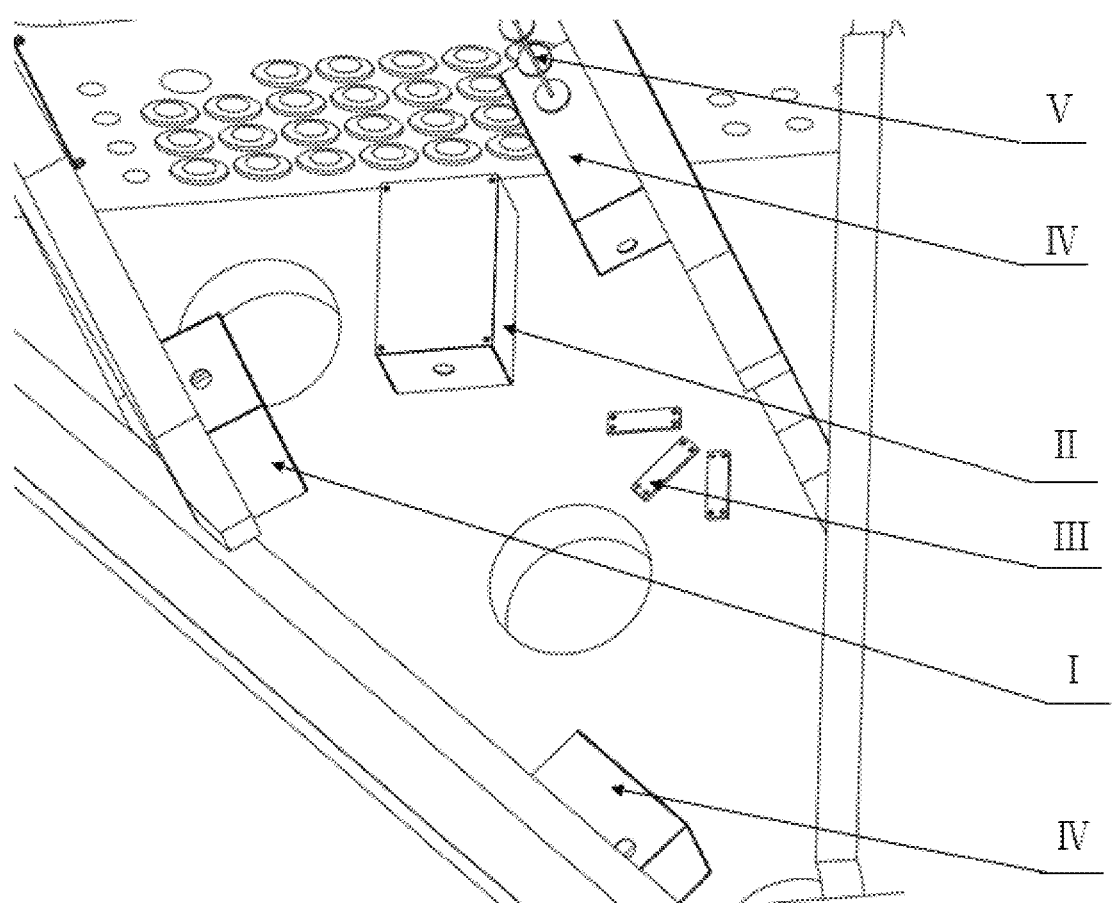
FIG. 4 is a partial enlarged drawing of a position of a water pipe passage.
Figure 5:
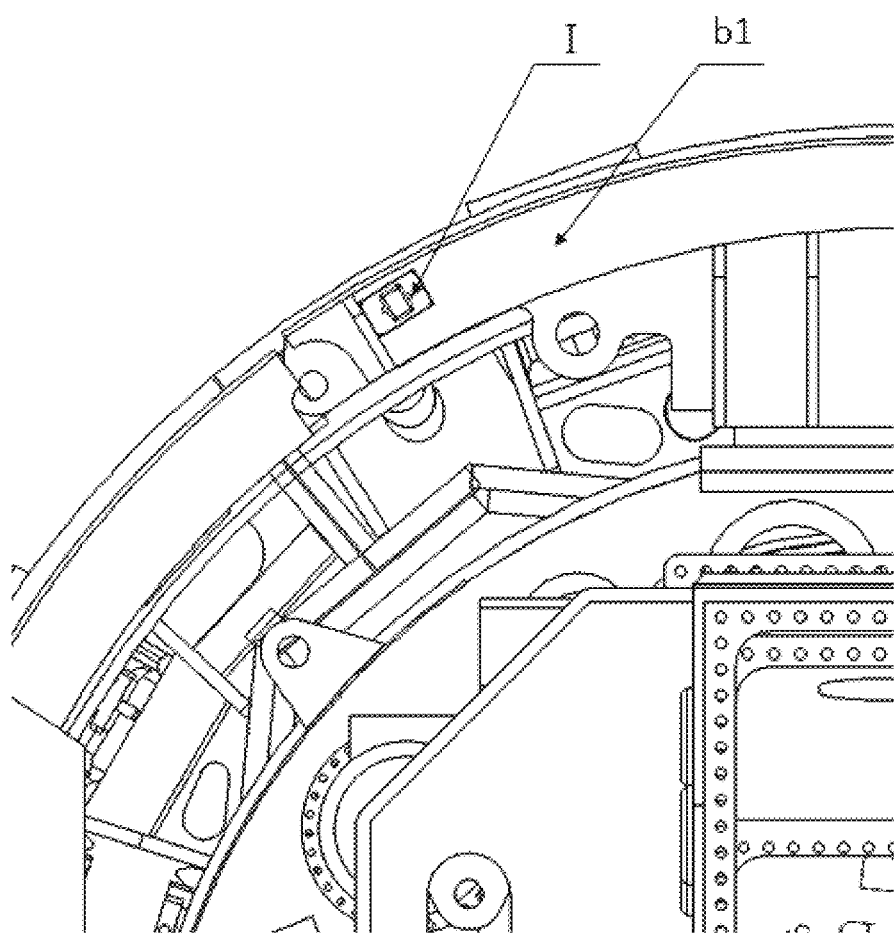
FIG. 5 is a partial enlarged drawing of a front shield.
Figure 6:
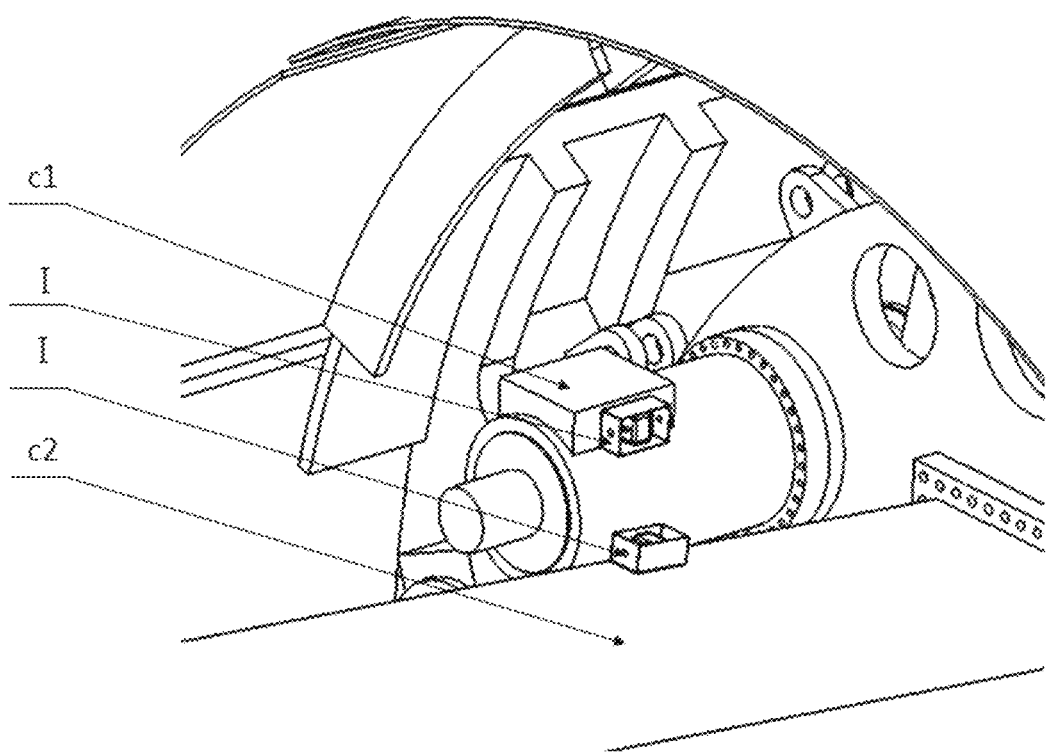
FIG. 6 is a partial enlarged drawing of a front end of a main beam.
Figure 7:
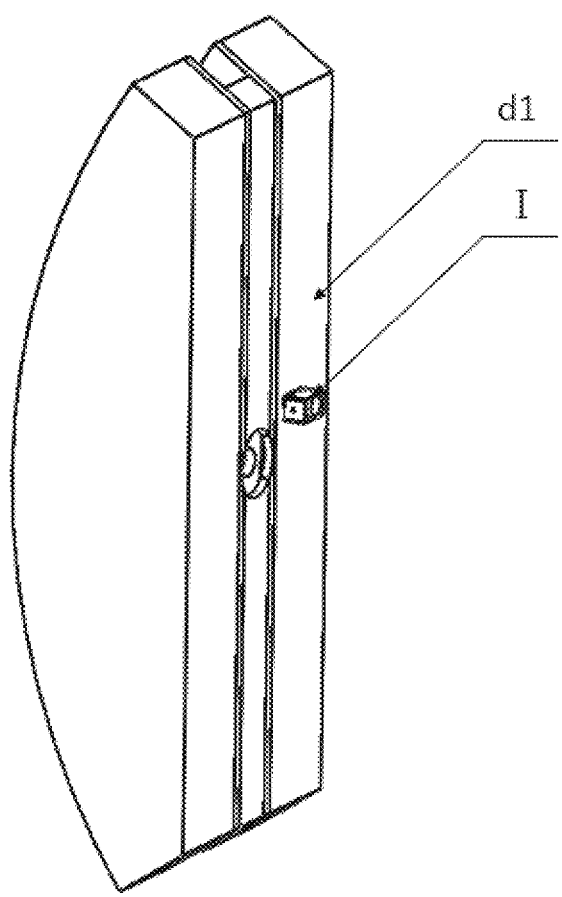
FIG. 7 is a structural diagram of a gripper shoe.
Figure 8:
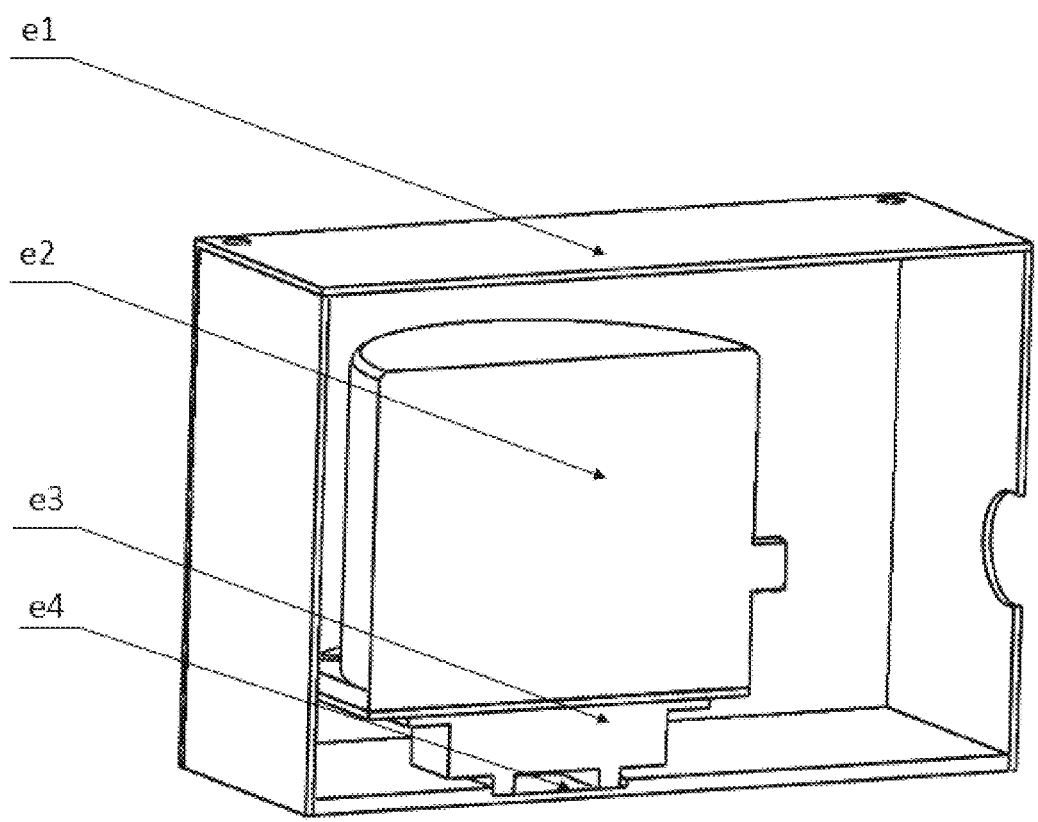
FIG. 8 is a schematic diagram of an industrial battery and a protection cover thereof.
Figure 9:
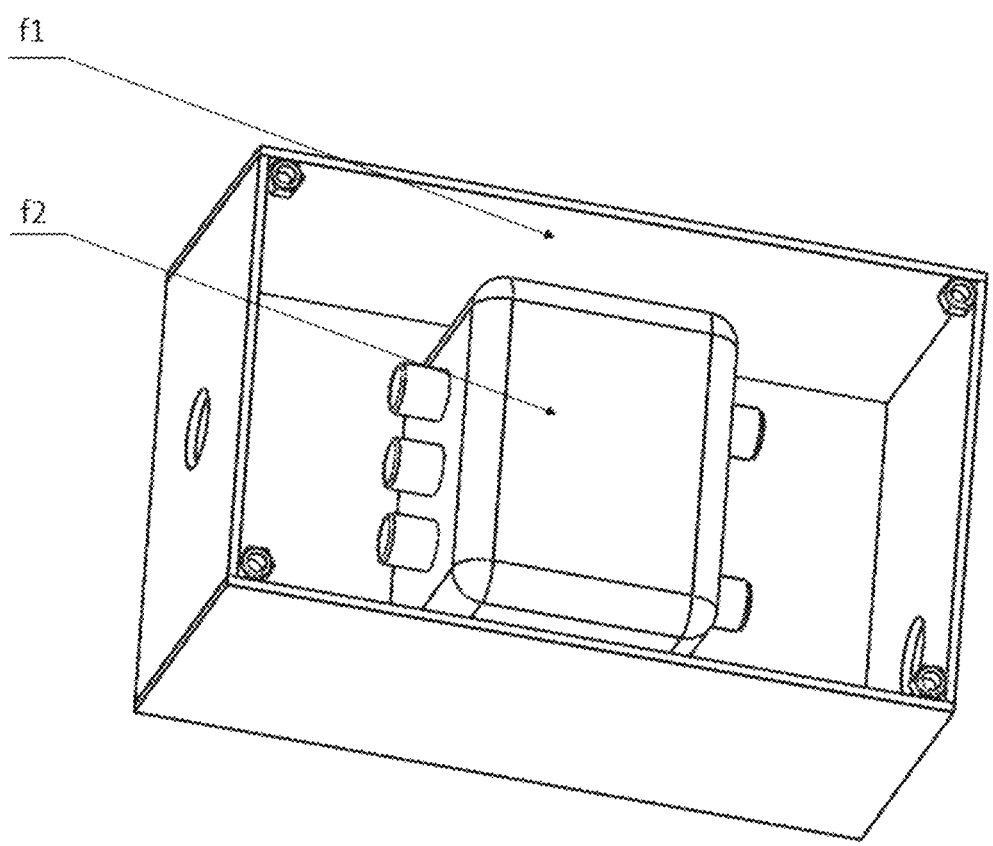
FIG. 9 is a schematic diagram of sensor nodes (including vibration and strain) and protection covers thereof.
Figure 10:
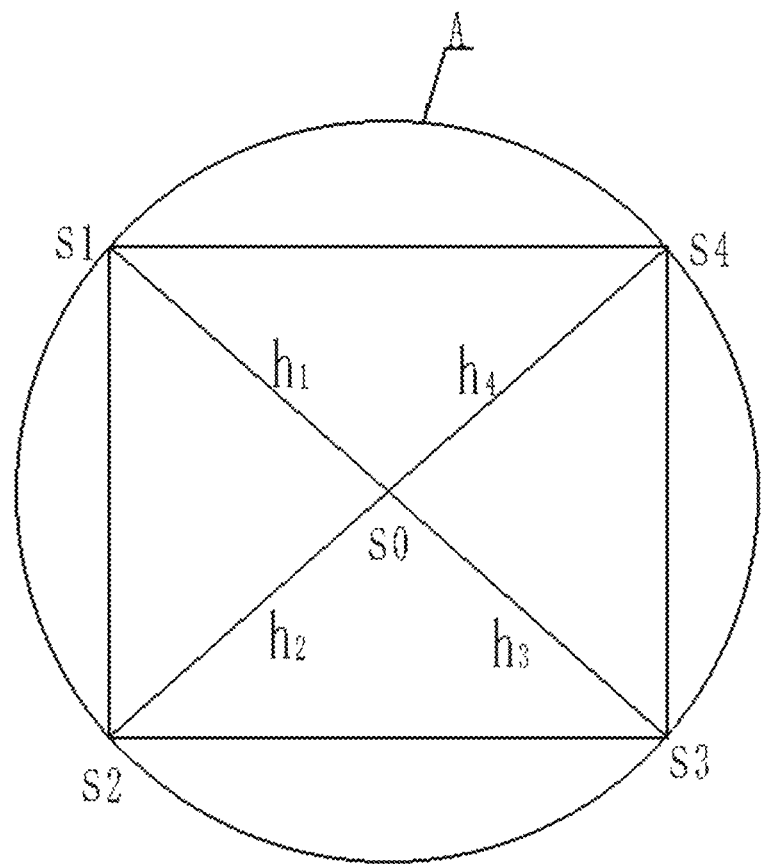
FIG. 10 is a schematic diagram of an equivalent mapping measuring model.

In the figures: 1: the cutterhead; 2: the front shield; 3: the main beam; 4: the gripper shoe;

a1: the manhole; a2: the water pipe passage; b1: the top inner surface of front shield;

c1: side surface of motor box of the drive electric motor; c2: front end of the main beam; d1: inner side surface of the gripper shoe;

e1: the protection cover of the industrial battery; e2: the industrial battery;

e3: the powerful magnetic connector; e4: the groove of protection cover of the industrial battery; f1: the protection cover of the node; f2: the node(sensor);

I: the node(sensor) and protection cover thereof; II: the voltage node (matched with a strain gauge) and protection cover thereof;

III the strain gauge; IV: the industrial battery and protection cover thereof; V: the antenna; S0: equivalent mapping to-be-measured point;

S1, S2, S3, S4: four direct measurement points;

h1, h2, h3, h4: distances from direct measurement points to equivalent mapping to-be-measured point;

A: measuring circle for limiting a measuring range.

DETAILED DESCRIPTION

Specific embodiments of the present invention are described in detail below in combination with drawings and technical solutions. FIG. 1 is a schematic diagram of a main machine system of TBM of a project, including the major components of a cutterhead, a front shield, drive electric motors, a main beam, gripper shoes and the like. During operation, the cutterhead of the TBM continuously cuts rock; and under the impact action of the rock, the cutterhead generates a large load and the load is transferred to components behind the cutterhead, causing vibration of the front shield, the drive electric motor, the main beam and the gripper shoe.

In the position of the cutterhead, the vibration sensor arranged in the water pipe passage of the cutterhead is powered by a battery. At proper sampling frequency, the lifetime of the battery is about 1 week, and a collected vibration signal is transmitted through an antenna. The strain gauge arranged in the water pipe passage of the cutterhead measures a strain score of the to-be-measured point; the strain gauge is matched with the voltage node to measure a strain signal; and the signal is amplified through the antenna and then transmitted to a gateway. In addition, the vibration sensors of the front shield, the drive electric motor, the front section of the main beam and the gripper shoe respectively transmit vibration signals to the gateway through the antenna.

After all the sensors transmit the signals to the wireless gateway, all the data are processed by supported software of the computer, and are displayed and stored in real time. For the equivalent mapping measuring model, the strain sensors are arranged at S1, S2, S3 and S4 and the equivalent mapping to-be-measured point S0, so as to determine various parameters of the assessment model and further calculate the strain of S0. Through this data flow mode, real-time vibration and strain signals generated during operation of the TBM are displayed on the computer of the operator's console of the TBM, and a work log of the TBM is generated to achieve expected functional requirements.

INDUSTRIAL APPLICABILITY

The present invention provides a monitoring device and an all-weather remote monitoring and forecasting system thereof. The present invention acquires monitoring data through the vibration and strain sensors and the wireless data transmission system, thereby realizing long-term real-time monitoring for vibration and strain states of key positions of the main machine system of the TBM during operation, conducting equivalent mapping evaluation on other positions which cannot be directly measured so as to feed back the operating state of the TBM to operators in time, preventing sudden fault in key positions of the main machine system of the TBM and ensuring safe and reliable operation of the TBM.

The invention claimed is:

1. A vibration and strain monitoring method for key positions of a tunnel boring machine (TBM), comprising the following steps:

the arrangement of sensor nodes:

step 1, overall safety layout the monitoring method is used to measure a cutterhead, a front shield, drive electric motors, a main beam and gripper shoes of tunnel boring machine; a monitored component requires that a measurement point reflects a motion state and is relatively safe; and a specific layout is as follows:

cutterhead sensor nodes are arranged in two manholes and two water pipe passages of the cutterhead; only vibration sensors are arranged in the manholes, and a vibration and a strain sensor are arranged in the water pipe passages;

vibration sensor nodes are arranged on the top and the inner surface of the front shield;

a vibration sensor node is arranged on the side surface of a motor box of the drive electric motor;

a vibration sensor node is arranged on the upper surface of the front end of the main beam;

a vibration sensor node is arranged on the inner side surface of the gripper shoe;

step 2, local strengthening protection and connection metal protection covers are added for sensor nodes and industrial batteries to provide impact resistance and water and moisture resistance; all the metal protection covers are fixed by welding; the sensor nodes and the metal protection covers are connected through a powerful magnetic connector, and a groove corresponding to the magnetic connector is formed in the bottom of the metal protection cover; wireless signal transmitting and receiving antennas are provided; and the strain sensor for collecting strain information is connected and fixed with the detected positions through threads;

step 3, power supply the sensors in the cutterhead are powered by industrial batteries; and the sensors in other monitoring positions are powered directly by a power line;

step 4, signal transmission and monitoring a wireless gateway is arranged in an operator's console of the TBM, and accepts vibration and strain signals of the cutterhead and vibration signals of the front shield, the main beam, the drive electric motor and the gripper shoe; the wireless gateway gives an early warning for detected strain and vibration signals which are higher than normal values, and displays the detected strain and vibration signals on a computer of the operator's console to generate a work log of the tunnel boring machine;

establishment of an equivalent mapping measuring model:

an evaluated value of an equivalent mapping to-be-measured point S0 is as follows:

$$\varepsilon_0 = \frac{\beta}{\sum \alpha_i}\left(\sum_{i=1}^{4}(\alpha_i \varepsilon_i)^P\right)^{\frac{1}{P}}$$

in the formula: $\varepsilon_0$ is the strain of a to-be-measured point S0;

$\varepsilon_i$ is the strain of measurement points S1, S2, S3 and S4;

$\alpha_i$ is a position parameter of each measurement point; $\alpha_1$=1~10; the shorter the distance from each measurement point to the point S0, the larger the corresponding $\alpha_1$ is;

P is a local structural parameter of a measured position formed by the measurement points S1, S2, S3 and S4;

if no reinforcing rib is arranged, P=1; and if reinforcing ribs are arranged, P=1–10; the more the reinforcing ribs are, the larger the P is;

β is a sudden change coefficient; when reinforcing ribs are arranged at the to-be-measured point S0, β=0.3~0.7; when sudden change of the strain occurs at the to-be-measured point S0, β=1.1~1.6; and when no special structure is arranged at the to-be-measured point S0, β=1.

2. The vibration and strain monitoring method for key positions of the tunnel boring machine according to claim 1, wherein the diameter of a measuring circle formed by the measurement points S1, S2, S3 and S4 is not greater than 0.5 m.

\* \* \* \* \*